United States Patent [19]

Huang et al.

[11] Patent Number: 5,694,315
[45] Date of Patent: Dec. 2, 1997

[54] METHOD FOR SCANNING MULTIPLE IMAGES IN ONE SCANNING PROCESS

[75] Inventors: Wei-Jen Huang, Taichung; Ming-Mu Hsieh, Hsinchu; Hsi-Chin Chen, Taipei; Hsin-Chung Chang, Hsinchu; Alpha Tsay, Taipei, all of Taiwan

[73] Assignee: Umax Data Systems, Inc., Hsinchu, Taiwan

[21] Appl. No.: 469,647

[22] Filed: Jun. 6, 1995

[51] Int. Cl.$^6$ .................................................. G06K 9/20
[52] U.S. Cl. ................................. 364/130; 382/175
[58] Field of Search ................................ 364/130, 559; 355/230, 75, 127; 250/559.3, 559.36, 559.37, 559.4, 559.44, 566–570, 491.1; 382/318, 319, 184, 287, 289, 291, 294, 175, 182; 235/486; 412/11, 14

[56] References Cited

U.S. PATENT DOCUMENTS

| | | | |
|---|---|---|---|
| 3,935,583 | 1/1976 | Spence-Bate | 355/75 |
| 5,383,754 | 1/1995 | Sumida et al. | 412/11 |
| 5,483,325 | 1/1996 | Bodapati et al. | 355/230 |

Primary Examiner—Reba I. Elmore
Assistant Examiner—Steven R. Garland
Attorney, Agent, or Firm—W. Wayne Liauh

[57] ABSTRACT

A novel method for scanning multiple images in a single scanning process is disclosed. The process utilizes at least a frame holder, which contains a front frame section and a back frame section that are glued together at their top edges and are separable at least at their bottom to allow a sheet of scanning material to be placed therebetween. Each of the front and back frame sections contains a cluster of matching orientation holes on their right and left sides with a predetermined pattern to allow a computer program to achieve scan area recognition and orientation. During the scanning process, the at least one frame holder containing the image is scanned, wherein the sides of the frame holder are detected as black signals and the orientation holes are detected as white signals. Then a computer program is used to perform a previewing recognition process by detecting and carving out a scanning area corresponding to each frame holder based on the black signals and the white signals of the frame holder. The frame holder can contain a plurality of scanning windows, and more than one frame holder can be utilized in the same scanning process.

6 Claims, 5 Drawing Sheets

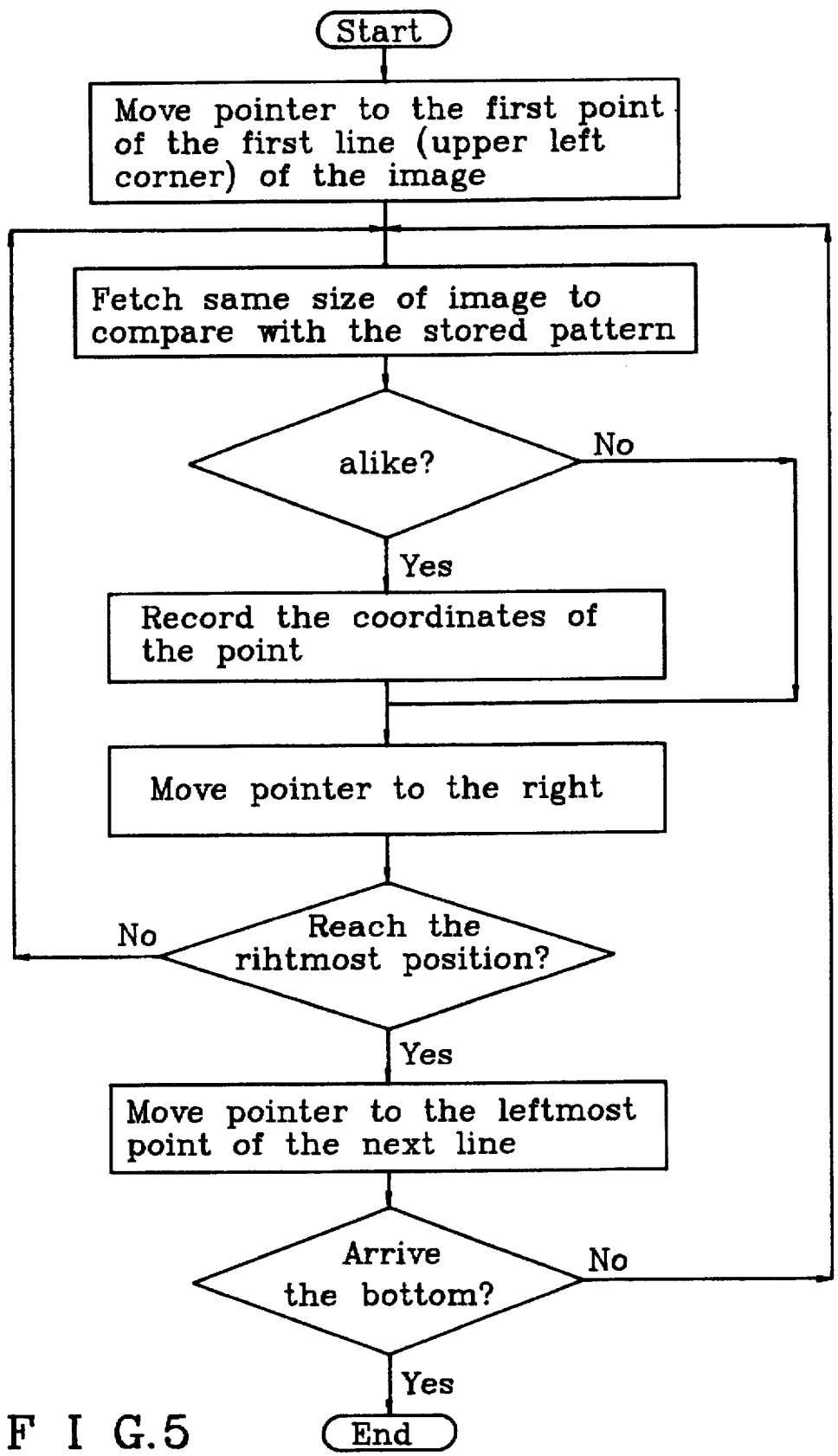
F I G. 5

METHOD FOR SCANNING MULTIPLE IMAGES IN ONE SCANNING PROCESS

BACKGROUND OF THE INVENTION

In conventional scanning process, only one image is acquired in one scanning process. Therefore, a multiplicity of scanning processes must be performed when a number of documents and images need to be scanned. It is a redundant and time-consuming operation. Thus, a multiple scanning method is presented here to improve the productivity.

SUMMARY OF THE INVENTION

It is an object to provide a multiple scanning method. By means of the different sizes of the rectangular frame holders, many images are captured in one scanning process. Furthermore, a plurality of orientation holes are provided on the right and left hand side of the frame holder to achieve the scan area recognition and orientation. These orientation holes not only provide a unique identification for each frame holder, they also facilitate the computers to locate and fine-tune the scan area automatically.

BRIEF DESCRIPTION OF THE DRAWINGS

FIG. 4 is a schematic diagram of the marks expression pattern of the present invention.

FIG. 5 is a flow chart of the computer program for performing mark recognition process of the present invention.

DETAIL DESCRIPTION

Figure 1:
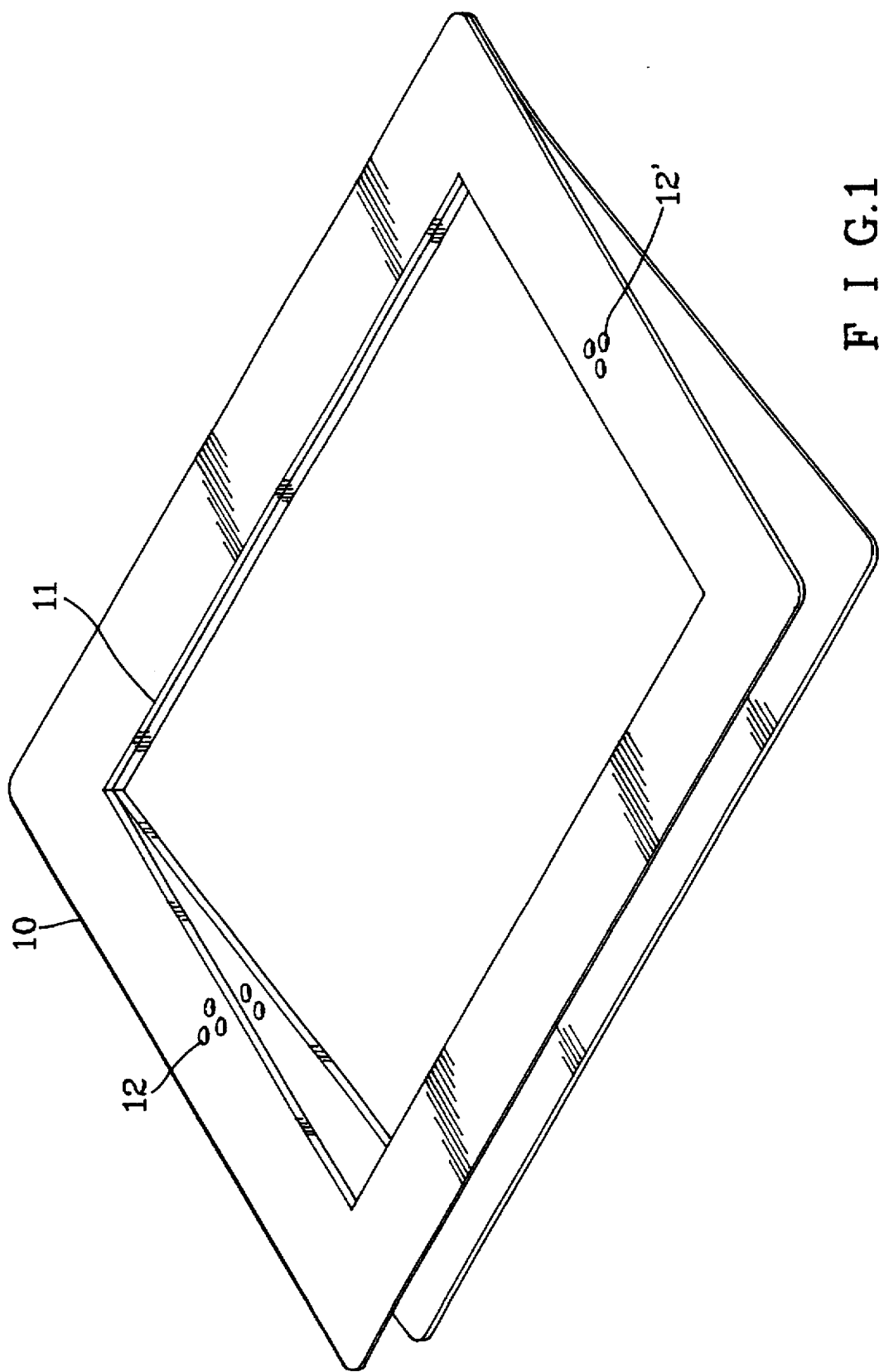
FIG. 1 is a pictorial view of an embodiment of a frame holder of the present invention.
Figure 2:
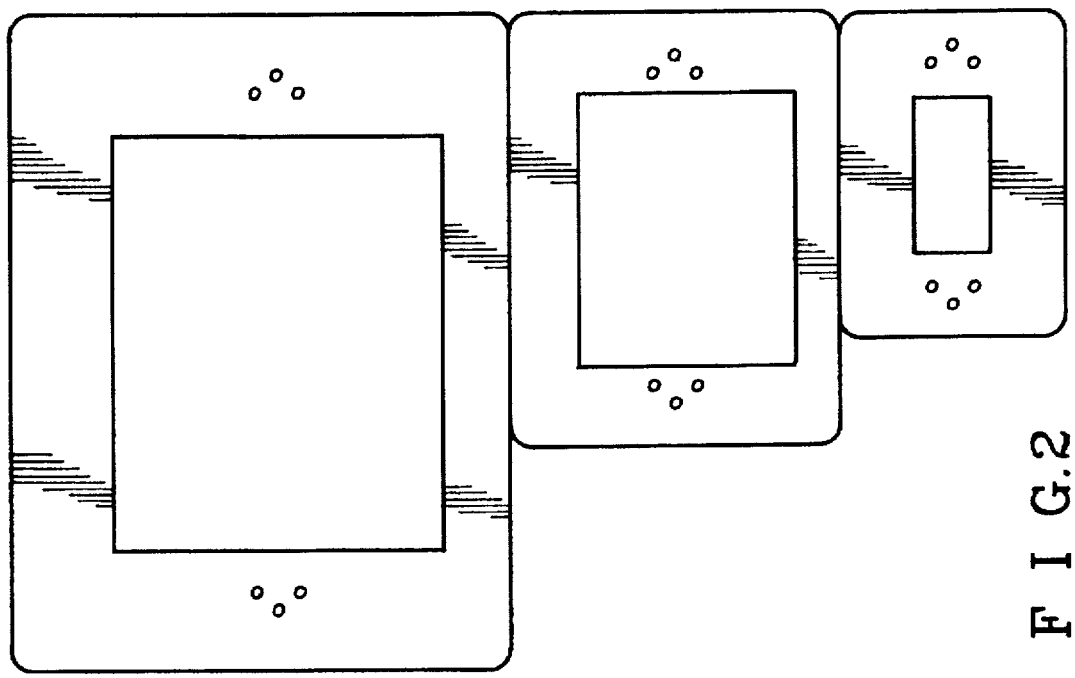
FIG. 2 is a plan view of different size of frame holders of the present invention.

FIG. 1 shows an illustration of the frame holder. There is a rectangular window (11) in the center of the frame holder (10). The orientation holes (12), (12') are located on the both sides of the frame holder. The frame holder (10) is constructed by two thin slices glued at the top edge. The bottom edge should be lifted up to insert the scan material. The orientation holes (12), (12') are used by the program to recognize the correct scan area (see the next present example). Different sizes of frame holders are designed according to the features of the frame holder (10). FIG. 2 shows the variance of frame holders. Any association of the different size of frame holder is acceptable to capture many images in one scanning process.

Figure 3:
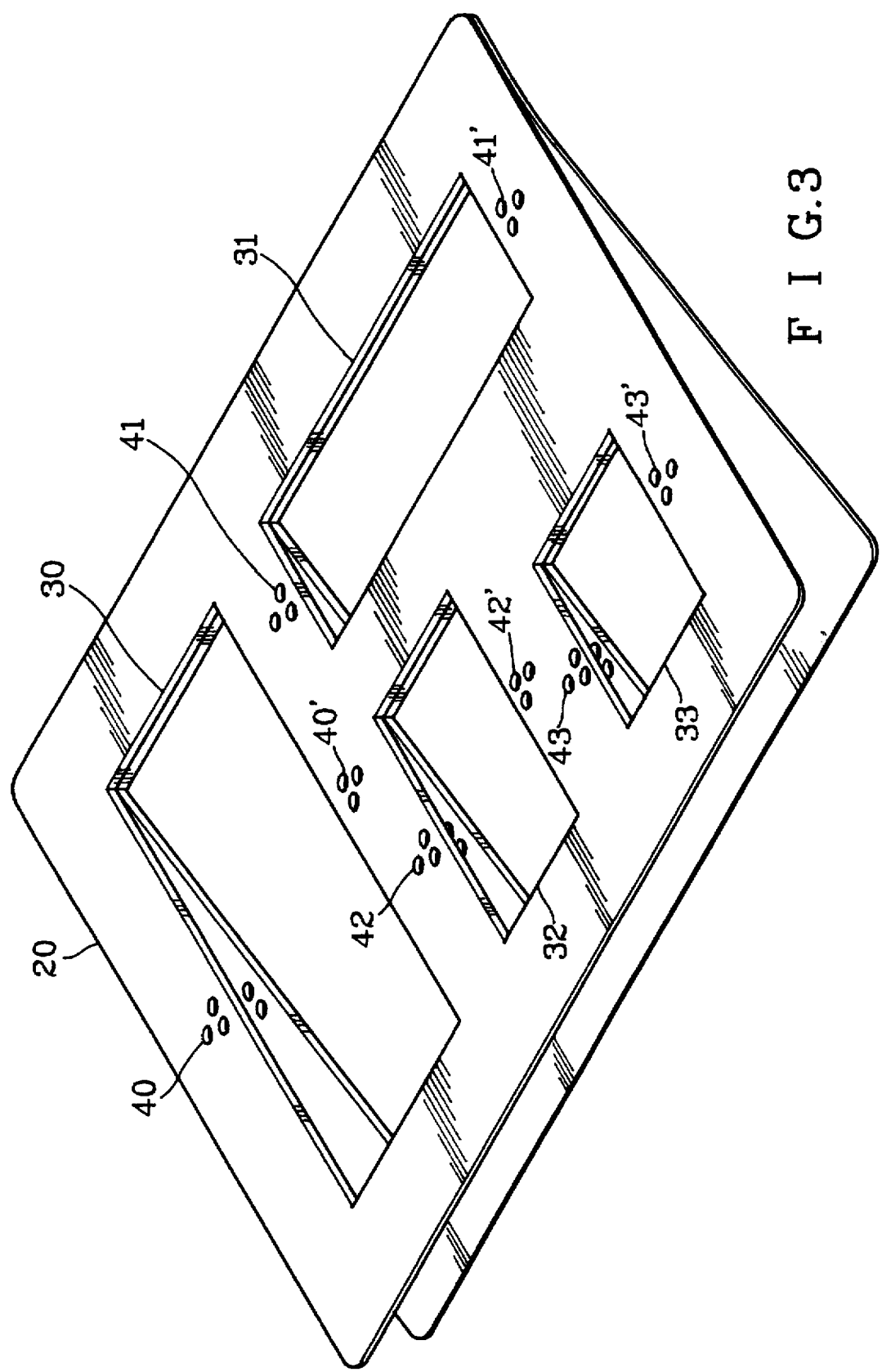
FIG. 3 is a pictorial view of another embodiment of a frame holder of the present invention.

Here is another present example. FIG. 3 shows another embodiment kind of frame holder. Similar to the frame holder (10), the frame holder (20) is also constructed by two thin slices glued at the top edge. The bottom edge can be lifted up to insert the scan material. In this example, there are four rectangular windows (30), (31), (32), (33) inside the frame holder (20) to hold four different sizes of scan material. There are also orientation holes (40) (40'), (41) (41'), (42) (42'), (43) (43') located on the both side of each rectangular frame. Each orientation hole of (40) (40'), (41) (41'), (42) (42'), (43) (43') located on the both side of each rectangular frame. Each orientation hole of (40) (40'), (41) (41'), (42) (42'), and (43) (43') is hollowed out as a circle.

When a scanning process starts, the scan light could not go through the frame holder (20), we get black signals. In the meanwhile, the scan light passes through the orientation holes (40) (40'), (41) (41'), (42) (42'), and (43) (43'), we get the white signals. Therefore, a pattern with white circle images on the black background could be found when scanning these holes. FIG. 4 illustrates the signal pattern of a hole. The "X" and "0" in the figure shows a black signal and a white signal, respectively. In addition, the symmetry of orientation holes is helpful to detect the orientation of the scanned image.

FIG. 5 demonstrates the control and data flow (the algorithm) of the orientation hole recognition. We start at the first pixel of the first line, that is, the left-top side of the image, then compare it with the given pattern which is described above. If the image is similar to the given pattern, we record the coordinate of this hole and move the image pointer right. Otherwise, we move the image pointer to the next position only. In the meanwhile, we have to check whether the pointer reaches the rightmost side of the image or not. If the pointer reaches the rightmost side of the image, we reset it to the leftmost side of the following line. The process of comparison described above is taken line by line until the last line of the image encountered. Thus, all orientation holes of the frame holders would be located on the image.

Figure 6:
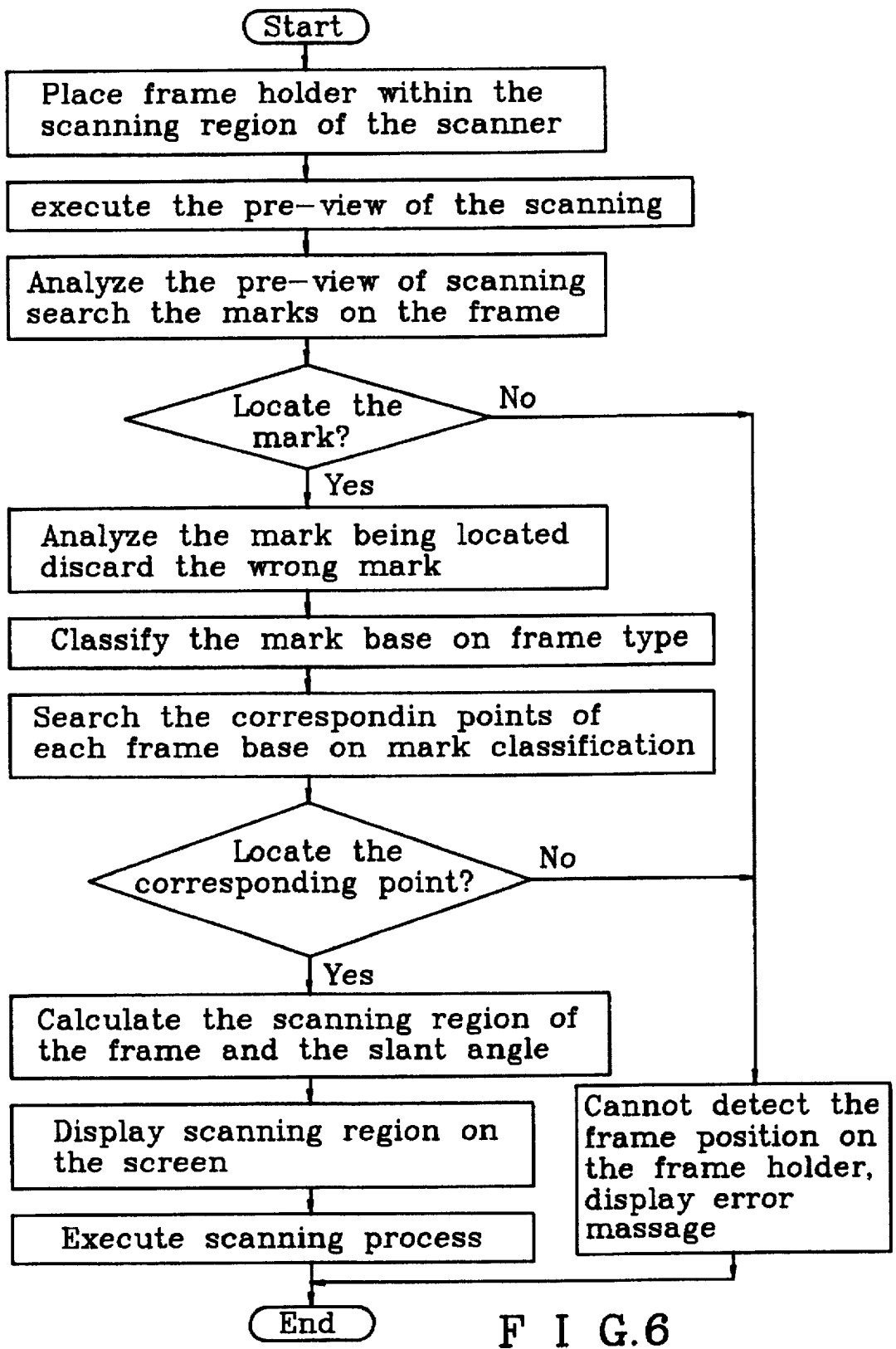
FIG. 6 is a flow chart illustrates the overall operation procedures of the present invention.

FIG. 6 describes the complete process of this present example. First, we put the frame holders within the scan area of a scanner. A preview image will be obtained after doing the preview function. Second, find out all the orientation holes of the frame holder according to the algorithm shown above. If there are no holes found, an error message is displayed and the process is terminated. For improved accuracy and increased speed, we eliminate the nonsense holes caused by the scanning and calculation error. Next, the orientation holes so found are classified to the different sizes of the frame holder. If it is not able to classify these orientation holes, an error message is shown and process is terminated. Next, we locate the scanning area and calculate the tilt angle of each frame holder. Finally, a final scanning process will capture the multiple images by means of the detected frame holders.

We claim:

1. A method for scanning multiple images in a single scanning process comprising the following steps:

obtaining at least a frame holder, which comprises a front frame section and a back frame section that are glued together at their top edges and are separable at least at their bottom to allow a sheet of scanning material to be placed therebetween, each of said front and back frame sections contains a cluster of matching orientation holes on their right and left sides with a predetermined pattern to allow a computer program to achieve scan area recognition and orientation;

scanning said at least one frame holder containing said image, wherein said sides of said frame holder are detected as black signals and said orientation holes are detected as white signals;

using a computer program to perform a previewing recognition process by detecting and carving out a scanning area corresponding to each frame holder based on said black signals and said white signals of said frame holder.

2. The method for scanning multiple images in a single scanning process of claim 1, wherein:

(a) all of said clusters and orientation holes have the same pattern;

(b) the computer program detects the location of the frame holder by a pattern matching process using said cluster of orientation holes as a reference; and (c) the computer program determines the size and orientation of said image in said frame holder by a relationship between said cluster of said orientation holes.

3. The method for scanning multiple images in a single scanning process of claim 1, wherein said frame holder contains a plurality of scanning windows, each scanning window having a set of top, bottom, left and right side sections, and a corresponding cluster of orientation holes on each of said left and right side sections, so as to allow a plurality of images to be scanned with a single flame holder.

4. The method for scanning multiple images in a single scanning process of claim 1, wherein the computer program stores a data base relating the scanned signal of the orientation holes to a predetermined rectangular pattern of a standard size to contain said scanned area.

5. The method for scanning multiple images in a single scanning process according to claim 1 wherein a plurality of said frame holders are used in the scanning process.

6. The method for scanning multiple images in a single scanning process according to claim 1 wherein a plurality of said frame holders of different sizes are used in the scanning process.

* * * * *